Patented June 24, 1930

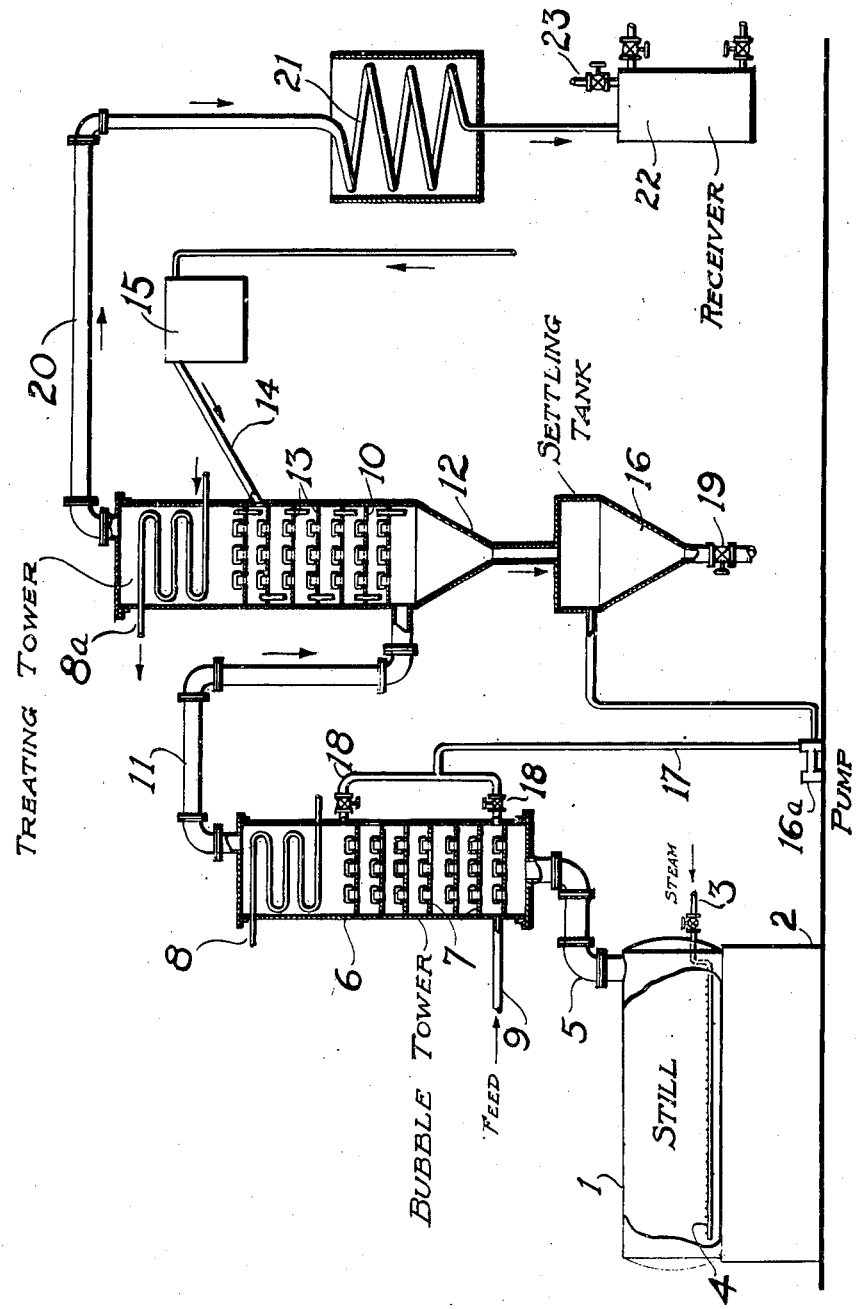

1,768,342

UNITED STATES PATENT OFFICE

REGINALD K. STRATFORD, OF SARNIA, ONTARIO, CANADA, ASSIGNOR TO STANDARD OIL DEVELOPMENT COMPANY, A CORPORATION OF DELAWARE

PROCESS AND APPARATUS FOR TREATING HYDROCARBON OILS

Application filed October 16, 1925. Serial No. 62,710.

This invention relates to improvements in processes and apparatus for the treatment or purification of hydrocarbon oils, particularly naphtha or gasoline produced by cracking processes, and similar products. An important feature of the invention is the passage of the oil to be treated in contact with a moving body of a treating agent, for example a finely divided solid absorbent or adsorbent material.

The invention will be fully understood from the following description, taken in connection with the accompanying drawing, in which the figure is a diagrammatic sectional view, showing a preferred form of apparatus constructed according to this invention.

Referring to the drawing, reference numeral 1 denotes a distillation vessel which may be a shell still, as shown, or other suitable equipment. The still may be heated by furnace 2 or by internal heating means. A pipe 3, having a perforated distributing arm 4, may be used for supplying steam or the like when this is desirable. The still 1 is connected by a vapor line 5 with a fractionating column 6. The column may have the usual bell-cap plates 7 or equivalent vapor-liquid contact means. A cooling coil 8 may be arranged in the upper portion of the column. Alternatively, such upper portion may be of sufficient extent to serve as a partial condenser without positive cooling means. A pipe 9 entering the bottom of the column 6 is connected with a source of the liquid oil to be charged into the still.

In accordance with this invention a treating tower 10 is provided; in it the still vapors are brought into intimate contact with a finely divided or foraminous solid absorbent or adsorbent, with or without a chemical treating agent, or the like. The treating tower may be either a separate unit, as shown, or in combination with the fractionating column 6. All the fractionation and treating may take place simultaneously in the same tower. A vapor line 11 connected with the column 6 discharges into the tower 10 preferably adjacent its bottom portion 12. A cooling coil 8ª may be provided for regulating the temperature of the top of the tower, or the introduction of a cool treating material may be depended upon for temperature control.

The tower contains a series of perforated plates 13, or screens, baffles, or similar means for bringing vapors, liquids, and solids into intimate contact. The plates 13 may be of the well-known bell-cap type. Finely divided absorbents of the type referred to herein will pass readily in admixtures with oil through baffle means of the general nature indicated, and in so doing the absorbent is brought into intimate contact with vapors passing upwardly through the tubes. A feed line 14 connected with a receptacle 15 for the absorbent material is arranged to discharge upon an upper plate.

A settling tank 16 is connected to receive the solid absorbent and condensate formed in the tower 10. A pump 16ª conveys the condensate from an upper portion of the tank 16 to the fractionating column 6 through line 17. This line is provided with a plurality of valved branches 18, two being shown by way of illustration, so that the point of return of the condensate to the tower may be regulated. Tank 16 is provided with a draw-off 19 through which the absorbent may be removed.

A vapor line 20 leads from the top of the tower 10 to a condenser 21, in which the treated vapors are condensed and flow into receiver 22. A gas vent 23 of the usual type may be supplied on this receiver, and the valve on the vent may be used to control pressure on the system.

As illustrative of my invention, the treatment of pressure still naphtha with finely divided material of the type of Attapulgus clay will be described. It is to be understood, however, that the invention is applicable in other connections. For example, the treating tower may be installed in connection with a bubble tower receiving the cracked product from a cracking coil or pressure still. Other absorbents may be used, for example, various grades of fuller's earth and the materials used, which remove color-forming constituents and other impurities in the oil, will be generically termed "fuller's earth." The process is particularly advantageous in connection with cracked stocks, but natural naphtha, gasoline, refined oil, or lubricating oils may be advantageously treated in accordance with the invention.

The still 1 is charged with pressure still naphtha and is brought to a distillation temperature. Attapulgus clay (preferably of about 100–200 mesh fineness) suspended in a suitable oil is supplied to the treating tower 10 through the pipe 14. I prefer to use as the carrier or vehicle for the clay an oil which has already been subjected to the process. However, a portion of the oil to be treated, or other oil not detrimentally affecting the product may be used. The supply of material in line 14 is preferably so controlled that a substantially steady and uniform stream of clay passes continuously down through the column. When a liquid vehicle for the absorbent is used, it is desirable to provide an agitator in receptacle 15, to keep the solids in suspension.

The vapors from the still 1 pass through the fractionating column 6, which may be regulated in the well-known manner to produce a product of the desired volatility, and then enter the treating tower 10 through the pipe 11. The vapors pass up through the perforated plates 13 and come into intimate contact with the downflowing streams of oil containing clay. The temperature of the tower 10 is maintained sufficiently high ultimately to volatilize substantially all the constituents desired in the final product. Temperature regulation may be effected by controlling the temperature of the vapors entering the bottom of the tower, by changing the rate of cooling from coil 8$^a$, or in other ways.

In some cases extraneous heat may be supplied to the tower 10. The application of too much heat should be avoided, as it is often desirable that the vapors should be condensed at least momentarily during some portion of their travel through the tower, so that they may be subjected in liquid phase to the action of the absorbent. In the tower 10 fractionation and treating go on simultaneously.

The condensate and carrier oil collected in tank 16 may be returned continuously or intermittently to the column to serve as a reflux medium therein. Alternatively the condensate may be returned directly to the still, or any other suitable disposal may be made of it. The oil in tank 16 will contain color-forming bodies and other impurities removed from the vapors. Ordinarily, however, the impurities have been so modified that they will not again find their way through the fractionating column attached to the still.

The fractionation taking place in column 6 may be readily controlled by regulating the return of condensate through the lines 18, one or the other of which may be used in accordance with the reflux requirements of the column.

The amount of clay required will vary with the stock undergoing distillation, but, in general, clay in amount of from 2 to 5% of the weight of the stock is adequate. It is feasible to supply the clay without admixture with oil outside of the treating tower. Condensate formed in the tower will wash the clay down through the plates. In general, however, it is better to use a carrier oil than to supply the clay continuously or intermittently in dry grandular form. The clay or equivalent substance is preferably finely divided, for example to 100 mesh or finer.

The clay withdrawn from tank 16 through line 19 may be freed from oil in a continuous filtration plant, by settling, by a combination of these methods, or in any other suitable way. If adequate contact provisions are made in the treating tower, the clay will be practically completely spent when it enters tank 16. It may then be withdrawn and revivified in any approved manner as is well understood in the art. Where the efficiency of the tower is not so high, I contemplate circulating the clay one or more times before withdrawing and revivifying it. By bringing the feed of clay into the tower below the top bell-cap plate, danger of entrainment of clay by the vapors is minimized.

Color-forming constituents and certain other impurities in the oil are very efficiently removed, probably in the form of polymerization products, and are withdrawn with the condensate formed in the treating tower. The distillate obtained overhead from this tower is of good color and retains this characteristic even after long standing. The clay treatment ordinarily takes the place of acid treatment and rerunning of cracked distillates.

In some cases the clay absorption may constitute the sole operation upon the distillate. However, where the distillate contains a high precentage of sulfur, hydrogen sulfid, mercaptans, or gum-forming constituents, some acid treatment, "doctor," or other chemical process may be required, especially to improve the odor. Even in such cases the use of clay in the manner described effects material economy by eliminating rerunning. The additional treatment may be conducted in separate apparatus, but it is often desirable to utilize the tower 10 for this purpose. For example, metallic oxids or sulfids, such as those of copper, lead, or iron, may be supplied with the clay to modify the sulfur content of the oil vapors.

As noted above, opportunity may be given for some or all of the vapors to come at least momentarily into effective contact in liquid phase with the absorbent. The procedure described is adapted for use with a wide variety of solid absorbent or adsorbent treating agents, and is not limited to those specifically mentioned herein.

The preferred form of the invention described may be modified in various ways within the scope of the appended claims, in which it is my intention to claim all novelty inherent in the invention, as broadly as the prior art permits.

I claim:

1. Process of treating petroleum oil vapors, comprising bringing the vapors into intimate contact in a treating zone with a stream of oil carrying finely divided clay, maintaining a temperature sufficient to cause the desired product to pass as vapor from the treating zone, and condensing said product.

2. Process according to claim 1 in which the petroleum oil vapors are rectified while being treated.

3. Process according to claim 1 in which the temperature is so regulated as to allow the desired product, at least in part, to come into contact as a liquid with the clay.

4. Process of treating vapors of low boiling petroleum hydrocarbons to decolorize and remove gum-forming constituents, comprising bringing the vapors into the lower part of a rectification zone, flowing a stream of oil carrying finely divided clay into the upper part of said zone, rectifying said vapors while intimately commingling them with the clay, taking off the desired product as vapor and condensing the same.

5. Process of treating petroleum hydrocarbons to decolorize and remove gum-forming constituents, comprising heating the same to vaporize lower boiling fractions thereof, passing the vapors into the lower part of a rectification zone, flowing a stream of relatively involatile oil carrying finely divided clay into the upper part of said zone, rectifying said vapors while intimately commingling them with the clay, taking off the desired product as vapor, condensing the same, withdrawing unvaporized oil admixed with clay from the lower part of the rectification zone, separating the oil and clay and returning the oil to the heating operation.

6. Process of treating petroleum oil vapors containing sulfur, comprising bringing the vapors into intimate contact in a treating zone with a stream of oil carrying finely divided clay and a substance capable of modifying the sulfur content of the oil vapors, maintaining a temperature sufficient to cause the desired product to pass as vapor from the treating zone, and condensing said product.

7. The process of purifying mineral oil having unsaturated components, which comprises passing the oil in vapor phase into a liquid mixture of oil and fuller's earth, thereby removing gum-forming and color-imparting bodies.

8. The process of purifying mineral oil having unsaturated components, which comprises bringing the oil in vapor phase into contact with liquid oil having finely divided fuller's earth in suspension therein, thereby removing gum-forming and color-imparting bodies.

9. The process of purifying mineral oil having unsaturated components, which comprises bringing the oil in vapor phase into contact with a mixture of oil and fuller's earth, and maintaining the liquid oil at its boiling point by heat derived solely from said vapor, thereby removing gum-forming and color-imparting bodies.

10. The process of purifying cracked naphtha, which comprises bringing the naphtha in vapor phase into contact with liquid oil maintained at the temperature of the vapor and having a composition such that it is approximately in equilibrium with the vapor, and maintaining fuller's earth in suspension in the hot liquid oil, thereby removing gum-forming and color imparting bodies.

11. The process of purifying mineral oil having unsaturated components, which comprises bringing the oil in vapor phase into contact with a stream of oil containing fuller's earth in suspension therein, whereby gum-forming and color-imparting bodies are removed.

12. The process of purifying mineral oil having unsaturated components, which comprises passing the oil in vapor phase counter-current to a stream of oil containing fuller's earth in suspension therein, whereby gum-forming and color-imparting bodies are removed.

13. The process of purifying mineral oil having unsaturated components, which comprises bringing the oil in vapor phase into contact with a stream of oil at elevated temperature and containing fuller's earth, whereby gum-forming and color-imparting bodies are removed.

14. The process of purifying mineral oil having unsaturated components, which comprises passing the oil in vapor phase counter-current to a stream of liquid oil at elevated temperature and containing fuller's earth, whereby gum-forming and color-imparting bodies are removed.

15. The process of purifying mineral oil having unsaturated components, which comprises bringing the oil in vapor phase into contact with a stream of liquid oil containing fuller's earth in suspension therein, said liquid oil having a composition such that it is substantially in equilibrium with the vapor while said liquid oil is maintained at elevated temperature, whereby gum-forming and color-imparting bodies are removed.

16. The process of purifying mineral oil having unsaturated components, which comprises passing the oil in vapor phase counter-current to a stream of liquid oil containing fuller's earth in suspension therein, said liquid oil having a composition such that it is substantially in equilibrium with the vapor while said liquid oil is maintained at elevated temperature, whereby gum-forming and color-imparting bodies are removed.

17. The process of purifying cracked naphtha, which comprises bringing the cracked naphtha in vapor phase into contact with a stream of oil containing fuller's earth in suspension therein, whereby gum-forming and color-imparting bodies are removed.

18. The process of purifying cracked naphtha, which comprises passing the naphtha in vapor phase counter-current to a stream of naphtha at elevated temperature containing fuller's earth in suspension therein, whereby gum-forming and color-imparting bodies are removed.

19. The process of purifying mineral oil having unsaturated components, which comprises passing the oil in vapor phase upwardly in a path in which it comes into contact with liquid oil at elevated temperature descending in said path and containing fuller's earth in suspension, whereby gum-forming and color-imparting bodies are removed.

20. The process of purifying cracked naphtha, which comprises passing its vapor upwardly in a path in which it comes into contact with descending naphtha at elevated temperature and containing fuller's earth in suspension, whereby gum-forming and color-imparting bodies are removed.

21. The process which comprises producing a mineral oil distillate having unsaturated components, subjecting the distillate in vapor phase to fractionation to yield vapors of a low boiling fraction having unsaturated components, and bringing said vapors into contact with a stream of oil containing fuller's earth in suspension therein, whereby gum-forming and color-imarting bodies are removed.

22. The process which comprises producing cracked naphtha, subjecting the naphtha into vapor phase to fractionation to yield vapors of low boiling fraction having unsaturated components, and bringing said vapors into contact with a stream of naptha at elevated temperature containing fuller's earth in suspension, whereby gum-forming and color-imparting bodies are removed.

23. In a method of simultaneously fractionating and purifying vapors of hydrocarbon oil, the step which comprises passing the vapors upwardly in contact and interchange relation with descending refluxing liquid oil having fuller's earth in suspension.

24. In a method of simultaneously fractionating and purifying the vapors of hydrocarbon oil, the step which comprises passing the vapors upwardly in contact and interchange relation with descending refluxing liquid oil having fuller's earth and copper oxide in suspension therein.

25. In a method of simultaneously fractionating and purifying the vapors of hydrocarbon oil, the step which comprises passing the vapors upwardly through successive pools of refluxing liquid oil maintained at successively lower temperatures, at least one of said pools containing fuller's earth in suspension.

26. In a method of removing undesirable organic compounds from hydrocarbon oil, the step of fractionating the oil by passing the vapors thereof upwardly in contact and interchange relation with descending reflux liquid oil having in suspension therein throughout a substantial portion of its descent through the zone of fractionation a non-alkaline solid purifying agent.

27. In a method of removing undesirable organic compounds from hydrocarbon oil, the step of fractionating the oil by passing the vapors thereof upwardly in contact and interchange relation with descending reflux oil which forms a series of pools each of which is maintained at a successively lower temperature, and at least two of which contain in suspension a non-alkaline solid purifying agent.

28. In a method of removing undesirable organic compounds from hydrocarbon oil, the step of fractionating the oil by passing the vapors thereof upwardly through successive pools of reflux liquid oil maintained at successively lower temperatures, each of said pools containing in suspension a non-alkaline solid purifying agent.

29. The method of treating hydrocarbon oil, which comprises vaporizing the oil, and treating the vapors with a solid adsorbent material in amount from 2% to 5% of the weight of the oil, said material being suspended in oil.

30. Apparatus for the purification of hydrocarbon oils, comprising a still, a treating tower connected to receive vapors from the still, vapor-liquid contact means in said tower, means for preparing a mixture of a finely divided solid adsorbent material and on oil, means for flowing the finely divided solid adsorbent downwardly through the tower, a settling tank connected with the base of the tower for receiving condensate and said adsorbent, and separate means for bringing said condensate into contact with vapors formed in the still.

31. Apparatus according to claim 30, in which the still is provided with a vapor-liquid contact tower from which vapors pass into the treating tower and means are provided for returning condensate from the treating tower to the vapor-liquid contact tower at a plurality of points therein.

32. Apparatus according to claim 30, in which means are provided for discharging the mixture of finely divided solid adsorbent and oil into the treating tower just below the uppermost vapor-liquid contact means therein.

REGINALD K. STRATFORD.